Patented Dec. 6, 1949

2,490,756

UNITED STATES PATENT OFFICE 2,490,756

N-ALKENYL LACTAMIDES

William O. Kenyon and John H. Van Campen, Rochester, N. Y., assignors to Eastman Kodak Company, Rochester, N. Y., a corporation of New Jersey No Drawing. Application November 22, 1947, Serial No. 787,604

2 Claims. (Cl. 260—561)

This invention relates to N-alkenyl lactamides, polymers thereof, and process for their preparation.

The new unsaturated lactamides of the invention may be represented by the structural formula:

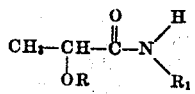

wherein R represents a member of the group consisting of hydrogen, a saturated alkyl group (e. g. methyl, ethyl, propyl, isopropyl, butyl, etc.), and aryl group (e. g. phenyl, tolyl, etc.), and aralkyl group (e. g. benzyl, etc.), and an acyl group (e. g. actyl, propionyl, butyryl, etc.), and $R_1$ represents an alkenyl group (e. g. allyl, methallyl, 2-chloroallyl, isoprenyl, etc.). The above defined compounds are valuable intermediates for the preparation of more complex organic compounds and are copolymerizable with other unsaturated compounds to resinous polymers which may be used for making molding compositions, lacquers, films, yarns, etc. Both the monomers and copolymers are soluble in most of the common organic solvents such as acetone, dioxane, and the like.

It is, accordingly, an object of the invention to provide n-alkenyl lactamides and copolymers thereof. Another object is to provide a process for preparing the same. Other objects will become apparent hereinafter.

In accordance with the invention, the new unsaturated lactamides are prepared by heating an alkyl lactate (e. g. methyl lactate, ethyl lactate, propyl lactate, isopropyl lactate, n-butyl lactate, isobutyl lactate, etc.) with an alkenylamine (e. g. allylamine, methallylamine, 2-chloroallylamine, propenylamine, isopropenylamine, crotylamine, etc.) and isolating the product by distillation. The preparation of unsaturated amines of the above kind is described in U. S. Patent 2,072,015, issued February 23, 1937.

The polymerization of the new monomers conjointly with one or more other unsaturated compounds is accelerated by heat and by polymerization catalysts which are known to accelerate the polymerization of ethylenically unsaturated compounds. Exemplary of such catalysts are the organic peroxides (e. g. benzoyl peroxide, acetyl peroxide and lauroyl peroxide), hydrogen peroxide, perborates (e. g. alkali metal perborates) and persulfates (e. g. alkali metal persulfates). The polymerization can be effected in mass or in the presence of an inert diluent such as dioxane. The monomers can also be copolymerized with one or more other ethylenic monomers having the general formulas:

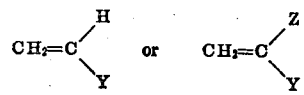

wherein Y and/or Z are alkyl, aryl, aralkyl, alkoxyl, aryloxyl, aralkoxyl, halogeno, acylamido, sulfonamido, sulfamyl, acyloxyl, carbalkoxyl, carbamido, nitrile, aldehydo, heterocyclic, alkylamino, dialkylamino, acylimino, etc. Specific compounds coming within the scope of the above formulas include among others propylene, furylethylene, isobutylene, vinyl formate, vinyl acetate, vinyl propionate, vinyl butyrate, vinyl stearate, vinyl thioacetate, vinyl benzoate, vinyl oxalate, isopropenyl acetate, methylene dimethyl malonate, divinyl formal, acrolein, α-methacrolein, vinyl chloride, vinyl bromide, isopropenyl chloride, vinylidene chloride, vinyl chloroacetate, vinyl trichloroacetate, vinyl isocyanate, isopropenyl isocyanate, vinyl acetylene, vinyl urethane, vinyl methyl ketone, vinyl phenyl ketone, vinyl benzyl ketone, vinyl cyclohexyl ketone, vinyl furyl ketone, vinyl p-tolyl ketone, isopropenyl methyl ketone, vinyl methyl ether, vinyl butyl ether, vinyl phenyl ether, isopropenyl methyl ether, vinyl sulfonamide, vinyl sulphonic acid, vinyl p-tolyl sulphoxide, vinyl β-naphthyl sulphone, vinyl p-tolyl sulphone, isopropenyl methyl sulphone, butadiene, isoprene, chloroprene, 2-acetoxybutadiene-1,3, N-vinyl methylacetamide, N-vinyl phenylacetamide, N-vinyl ethylacetamide, N-vinyl methylformamide, N-vinyl acetanilide, N-vinyl p-tolyl acetamide, N-vinyl cyclohexylacetamide, N-vinyl N-methyl butyramide, N-vinyl pyrrole, N-vinyl pyrrolidene, N-vinyl carbazole, N-vinyl pyridine, N-vinyl quinoline, styrene, α-chlorostyrene, vinyl phenol, vinyl naphthalene, divinyl benzene, isopropenyl benzene, N-vinyl succinimide, N-vinyl tetrahydrophthalimide, N-vinyl phthalimide, N-vinyl glutarimide, N-vinyl diglycolylimide, N-isopropenyl phthalimide, acrylonitrile, methacrylonitrile, α-chloroacrylonitrile, α-phthalimidoacrylonitrile, α-phenoxyacrylonitrile, acrylic acid, methacrylic acid, α-chloroacrylic acid, methyl acrylate, methyl methacrylate, methyl ethacrylate, benzyl acrylate, allyl methacrylate, β-ethoxyethyl acrylate, acrylamide, N-diacetyl acrylamide, N-ethyl acrylamide, N-diethyl acrylamide, N-diethyl acrylamide, etc. Still other unsaturated compounds which can be copolymerized with the new unsaturates of the invention to give valuable resinous products include the esters, amides and nitriles of maleic, fumaric, citraconic and itaconic acids. Examples of the latter compounds include methyl maleate, methyl fumarate, dimethyl maleate, dimethyl fumarate, diethyl maleate, diethyl fumarate, diisopropyl maleate, diisopropyl fumarate, maleamide, fumaramide, citraconamide, itaconamide, maleonitrile, fumaronitrile, citracononitrile, itacononitrile, and similar compounds. The preferred copolymers of the invention are obtained with starting polymerization mixtures having from 1 to 50 parts by weight of the new monomeric N-alkenyl lactamides and from 99 to 50 parts by weight of the other unsaturated monomers to be copolymerized therewith.

The following examples will serve to illustrate further our new N-allyl lactamides, polymers thereof, and the process for preparing the same.

Example 1.—N-allyl lactamide

A mixture of 236 gms. of ethyl lactate and 348 gms. of allylamine was heated on a steam bath for a period of 30 hours. The mixture was then distilled, the excess allylamine and other low boiling by-products coming over first at 15–20 mm. pressure, and the product per se distilling at 116° C. at 1 mm. pressure. The purified N-allyl lactamide was a clear, colorless, mobile liquid, which on analysis showed a nitrogen content of 11.06 per cent by weight compared to calculated theory of 10.85 per cent nitrogen. The yield of N-allyl lactamide was 243 grams.

Example 2.—Copolymer of N-allyl lactamide and methyl methacrylate

A solution of 1 gm. of N-allyl lactamide, 19 gms. of methyl methacrylate and 0.10 gm. of benzoyl peroxide was sealed into a pyrex glass tube and placed in a water bath at 60° C. A clear, colorless, hard polymer was obtained. The polymer was soluble in acetone.

Example 3.—Copolymer of N-allyl lactamide and styrene

A solution of 1 gm. of N-allyl lactamide, 19 gms. of styrene and 0.10 gm. of benzoyl peroxide was sealed into a pyrex glass tube and placed in a water bath at 60° C. The resulting polymer was slightly hazy, orange in color and hard. It was soluble in dioxane.

Other examples of our new copolymeric compounds prepared in similar manner as the preceding examples are illustrated in the following table:

The copolymers described in the preceding examples are soluble in common organic solvents, for example, acetone, dioxane methyl ethyl ketone, etc., and such solutions, with filling and softening materials added, if desired, give flexible sheets, films, lacquers or compositions which are useful for impregnating fibrous materials such as paper, textiles, and the like. The copolymers are also useful for the manufacture of molded plastics. Where R in the formula of the monomer is hydrogen, such monomers give copolymers which show increased susceptibility to water. This depends to some extent upon the particular second monomer employed for the preparation of the copolymer and also on the ratio of the N-alkenyl lactamide to the second monomer. Those copolymers of the invention having the higher percentage of free hydroxyl groups are soluble in a mixture of an organic sovent and a considerable proportion of water, for example, an acetone and water mixture. The water-susceptible copolymers are particularly useful as protective colloids and as substitutes for gelatin in photographic emulsions. While the coatings of these water-susceptible copolymers are permeable to the various processing solutions, they are not appreciably softened by the processing or subsequent washing steps so that the photographic image contained therein remains free from distortion. Another advantage is that low boiling organic solvents can be added to the aqueous compositions or photographic emulsions of the water-susceptible species of our new copolymers to facilitate the drying of the coated compositions and emulsions.

We claim:

1. A compound having the general structural formula:

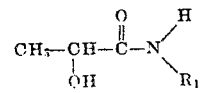

wherein $R_1$ represents an alkenyl group containing from 3 to 4 carbon atoms.

2. N-allyl lactamide.

WILLIAM O. KENYON.
JOHN H. VAN CAMPEN.

(References on following page)

| N-Allyl Lactamide, Per cent by weight | Second Monomer, Per cent by weight | Characteristics of Copolymer. |
|---|---|---|
| 1 | 99 Methyl methacrylate | Clear, colorless and hard. Soluble in acetone. |
| 2 | 98 Methyl methacrylate | Do. |
| 1 | 99 Styrene | Slightly hazy, orange and hard. Soluble in dioxene. |
| 2 | 98 Styrene | Do. |
| 1 | 99 Vinyl acetate | Clear, pale amber and soft. |
| 2 | 98 Vinyl acetate | Do. |
| 5 | 95 Vinyl acetate | Viscous liquid. |
| 1 | 99 Diethyl fumarate | Colorless and brittle. Soluble in acetone. |
| 2 | 98 Diethyl fumarate | Do. |
| 5 | 95 Diethyl fumarate | Do. |
| 1 | 36.5 Isopropenyl acetate. 62.5 Diethyl fumarate | Clear, slightly yellow and hard. Soluble in acetone. |
| 2 | 36 Isopropenyl acetate. 62 Diethyl fumarate | Do. |
| 5 | 35 Isopropenyl acetate. 60 Diethyl fumarate | Do. |
| 1 | 36.5 Vinyl acetate. 62.5 Diethyl fumarate | Clear, slightly yellow and slightly soft. Soluble in acetone. |
| 2 | 36 Vinyl acetate. 62 Diethyl fumarate | Do. |
| 5 | 35 Vinyl acetate. 60 Diethyl fumarate | Clear, yellow and soft. Soluble in acetone. |

REFERENCES CITED

The following references are of record in the file of this patent:

UNITED STATES PATENTS

| Number | Name | Date |
|---|---|---|
| 1,986,854 | Reid | Jan. 8, 1935 |
| 2,060,154 | Whitmore et al. | Nov. 10, 1936 |
| 2,141,546 | Strain | Dec. 27, 1938 |
| 2,197,723 | Hovey | Apr. 16, 1940 |
| 2,311,548 | Jacobson et al. | Feb. 16, 1943 |
| 2,357,283 | Peters | Sept. 5, 1944 |
| 2,426,885 | Kilgore | Sept. 2, 1947 |